United States Patent [19]

Hieda et al.

[11] Patent Number: 5,019,894

[45] Date of Patent: May 28, 1991

[54] WHITE BALANCE ADJUSTING CIRCUIT

[75] Inventors: Teruo Hieda; Kenji Kyuma, both of Kanagawa, Japan

[73] Assignee: Canon Kabushiki Kaisha, Tokyo, Japan

[21] Appl. No.: 592,635

[22] Filed: Oct. 3, 1990

Related U.S. Application Data

[63] Continuation of Ser. No. 387,695, Jul. 31, 1989, abandoned.

[30] Foreign Application Priority Data

Aug. 8, 1988 [JP] Japan .................. 63-196033
Aug. 8, 1988 [JP] Japan .................. 63-196034

[51] Int. Cl.$^5$ ............................................. H04N 9/73
[52] U.S. Cl. ...................................................... 358/29
[58] Field of Search ........................................ 358/29

[56] References Cited

U.S. PATENT DOCUMENTS 4,931,856 6/1990 Hieda et al. .................... 358/29

FOREIGN PATENT DOCUMENTS 192485 9/1985 Japan .
272500 7/1986 Japan .
245782 11/1986 Japan .
279795 12/1987 Japan .

OTHER PUBLICATIONS

Application Ser. No. 336,046.

*Primary Examiner*—John W. Shepperd
*Attorney, Agent, or Firm*—Robin, Blecker, Daley & Driscoll

[57] ABSTRACT

A white balance adjusting circuit which detects the ratio of color components in an illumination light around an object, independently from an image sensing system, and controls the gain of each color signal coming from the image sensing system, characterized in that it comprises means for correcting a signal indicative of the ratio of color components according to the color signal, not gain-controlled, coming from the image sensing system.

6 Claims, 8 Drawing Sheets

WHITE BALANCE ADJUSTING CIRCUIT

This application is a continuation of application Ser. No. 387,695, filed 7/31/89 now abandoned.

BACKGROUND OF THE INVENTION

1. Field of the Invention

This invention relates to a white balance adjusting circuit for color video cameras.

2. Description of the Related Art:

White balance adjustment is one of important signal control methods for color television cameras. White balance adjustment means that the gain for each color component of a sensed image signal is adjusted so that the ratio of three primary color components (red, green and blue) in an illumination (that is, ambient light) will be 1:1:1 for a white object. The ratio of three primary color components depends upon the type of illumination. Therefore, if the white balance adjustment is not correct, the real colors of an object cannot be correctly reproduced in the picture of the object, that is, the whole picture is bluish or reddish.

So far, external-metering automatic tracking type white balance adjusting devices have been provided (for example, in Japanese Laid-Open Patent Application Nos. Sho 54-53924 and Sho 55-158792) to assure an accurate and automatic white balance adjustment. To assure an automatic white balance adjustment, these devices are designed so as to detect the ambient light for an object by means of another optical system than a photographic optical system, and control the gain for each color component of a sensed image signal according to the results of detection. Concretely, each of these devices detects 2 or 3 different color components of the ambient light by means of 2 or 3 colorimetric sensors provided with color filters mounted on their fronts, and controls the gain of a color signal amplifier for the output of an image sensor according to the ratio of the detected values.

However, the conventional devices present a disadvantage in that, if an object or its surroundings have specific colors, the incident light in the colorimetric sensors may be influenced by these colors to deteriorate the colorimetric accuracy. If a red object is photographed, for example, the colorimetric sensors receive a red color signal having a greater amount of red components than that contained in the illumination light. As the result, the white balance adjustment is so deviated as to provide an entirely bluish picture.

SUMMARY OF THE INVENTION

An object of this invention is to provide a white balance adjusting circuit that is little affected by the colors of an object and its surroundings.

As an embodiment of this invention, a white balance adjusting circuit, which detects a ratio of color components in an illumination light around an object, independently from an image sensing system, and controls a gain of each color signal coming from the image sensing system, is characterized in that it comprises means for correcting a signal indicative of the ratio of color components according to the color signal, not gain-controlled, coming from the image sensing system.

Provided with the correcting means, the white balance adjusting circuit can correct any deviation of white balance due to the colors of an object, so that it is unlikely to be affected by the colors of the object and its surroundings.

Another embodiment of this invention, a white balance adjusting circuit, which detects a ratio of color components in an illumination light around an object, independently from an image sensing system, and controls a gain of each color signal coming from the image sensing system, is characterized in that it comprises means for correcting a signal indicative of the ratio of color components according to the color signal, not gain-controlled, coming from the image sensing system and a signal indicative of a focal length of a photographic optical system.

Provided with the correcting means, the white balance adjusting circuit can correct any deviation of white balance due to the colors of an object, so that it is unlikely to be affected by the colors of the object and its surroundings.

These and other objects and features of this invention will be better understood by reading the detailed description as given below and referring to the drawings annexed hereto.

DETAILED DESCRIPTION OF THE PREFERRED EMBODIMENTS

Figure 1:
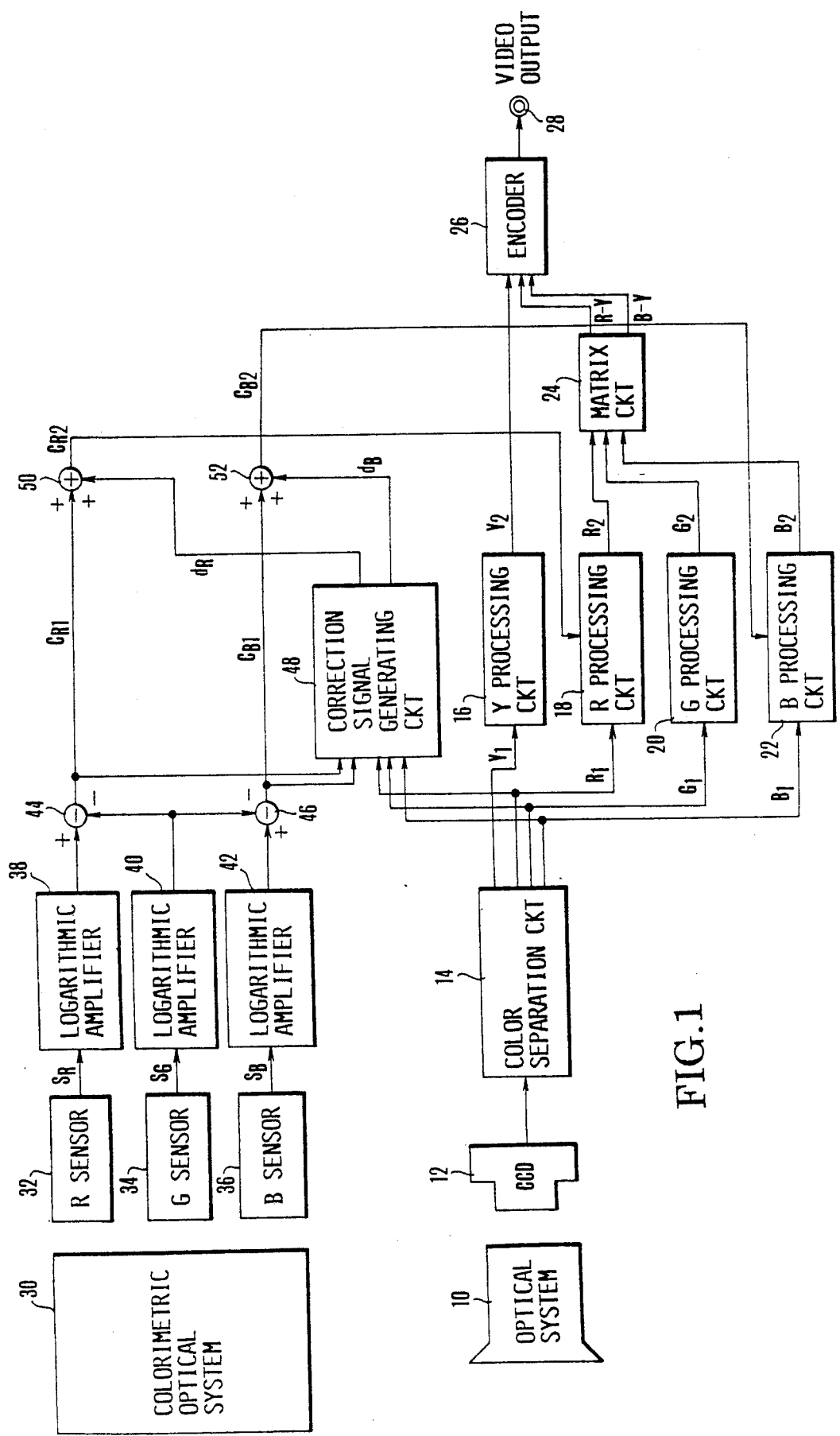
FIG. 1 is a block diagram showing the configuration of an embodiment according to this invention.

The preferred embodiments of this invention will be described below by referring to the drawings annexed hereto.

FIG. 1 is a block diagram showing the configuration of an embodiment according to this invention. In this figure, a photographic optical system 10 comprises photographic lenses, an iris and optical filters. A CCD image sensor 12 is provided with minute color filters, for example, red, blue and green, placed like a mosaic in its front. A color separation circuit 14 samples and holds the sensed image signals outputted by the image sensor 12, and separates a luminance signal Y and color signals R, G and B from one another. A luminance processing circuit 16 is used for any publicly known processing such as low-band filtering, clamp, gamma correction or clipping. A red processing circuit 18, a green processing circuit 20 and a blue processing circuit 22 carry out the same processing as the luminance processing circuit 16, and each of them is provided with a variable gain amplifier. A matrix circuit 24 forms color difference signals R - Y and B - Y from the signals R, G and B outputted by the red processing circuit 18, the green processing circuit 20 and the blue processing circuit 22 respectively. A video encoder 26 modulates the color-difference signals from the matrix circuit 24, combines them with a luminance signal coming from the luminance processing circuit 16, adds a synchronizing signal to the combined signals, and delivers video signals to a video output terminal 28.

A colorimetric optical system 30 for white balance adjustment comprises a condenser lens, a diffusing filter and an infrared removing filter. An R sensor 32 detects red components, a G sensor 34 detects green components, and a B sensor 36 detects blue components. 38, 40 and 42 are logarithmic amplifiers, and 44 and 46 are subtracters. The outputs $C_{R1}$ and $C_{B1}$ of the subtracters 44 and 46 correspond to the white balance gain control signals as used in the conventional white balance adjusting devices. A correction signal generating circuit 48 produces correction signals $d_R$ and $d_B$ from the outputs R, G and B of the subtracters 44 and 46 and the color separation circuit 14. Adders 50 and 52 add correction signals $d_R$ and $d_B$ to the outputs $C_{R1}$ and $C_{B1}$ of the subtracters 44 and 46 respectively. The outputs $C_{R2}$ and $C_{B2}$ of the adders 50 and 52 are supplied to the gain control terminals of the variable gain amplifiers in the red processing circuit 18 and the blue processing circuit 22 respectively.

The operations of the embodiment as shown in FIG. 1 will be described below. An object light enters the imaging plane of the CCD image sensor 12 through the photographic optical system 10. The image sensor 12 outputs a photoelectrically-converted signal corresponding to the image of the object. The color separation circuit 14 forms a luminance signal Y from the output of the image sensor 12, and separates the color signals R, G and B one from another. These signals Y, R, G and B outputted by the color separation circuit 14 are then processed by the luminance processing circuit 16, the red processing circuit 18, the green processing circuit 20 and the blue processing circuit 22 respectively. The matrix circuit 24 combines the outputs of the red processing circuit 18, the green processing circuit 20 and the blue processing circuit 22 to produce color-difference signals R - Y and B - Y. The encoder 26 combines the outputs of the luminance processing circuit 16 and the matrix circuit 24 to produce a video signal, which is then supplied to a video apparatus such as a video recorder through the video output terminal 28. The red processing circuit 18 and the blue processing circuit 22 control the gains for white balance adjustment.

The operations of the white balance adjusting circuit will be described below. The light of an object and its surroundings is received by the sensors 32, 34 and 36 through the colorimetric optical system 30. The sensors 32, 34 and 36 output electric signals $S_R$, $S_G$ and $S_B$ corresponding to the levels of the color components received by the sensors 32, 34 and 36 respectively. The outputs of the sensors 32, 34 and 36 are logarithmically compressed by the logarithmic amplifiers 38, 40 and 42 respectively. The subtracter 44 subtracts the output of the logarithmic amplifier 40 from the output of the logarithmic amplifier 38, while the subtracter 46 subtracts the output of the logarithmic amplifier 40 from the output of the logarithmic amplifier 42. As the results, the output $C_{R1}$ of the subtracter 44 is equivalent to log $(S_R/S_G)$, while the output $C_{B1}$ of the subtracter 46 is log $(S_B/S_G)$. The correction signal generating circuit 48 creates correction signals $d_R$ and $d_B$ from the outputs $C_{R1}$ and $C_{B1}$ of the subtracters 44 and 46 and the color signal outputs $R_1$, $G_1$ and $B_1$ of the color separation circuit 14. The adders 50 and 52 add the correction signals $d_R$ and $d_B$ to the outputs $C_{R1}$ and $C_{B1}$ of the subtracters 44 and 46 to produce the outputs $C_{R2}$ and $C_{B2}$ respectively, which then control the gains in the R processing circuit 18 and the B processing circuit 22 respectively.

Figure 2:
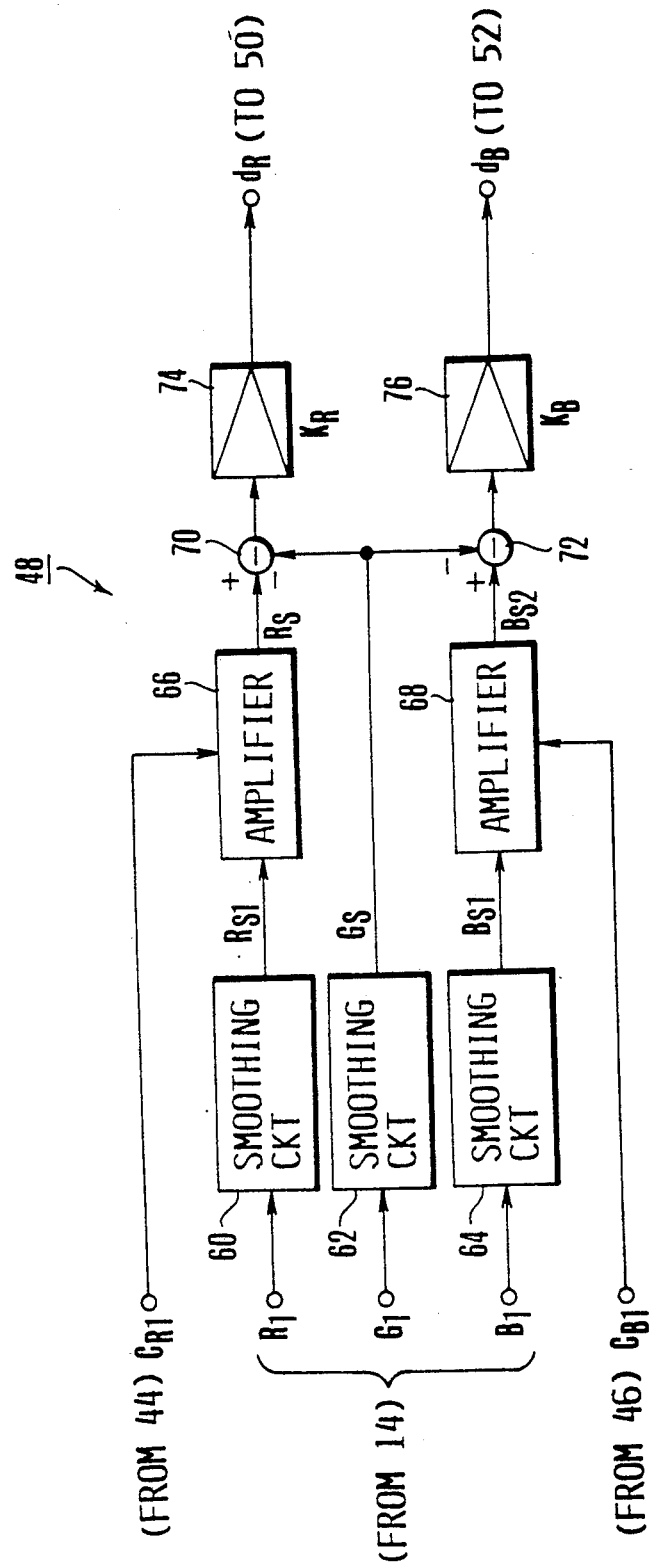
FIG. 2 is a block diagram showing the detailed configuration of the correcting signal generating circuit 48 as shown in FIG. 1.

FIG. 2 is a block diagram showing the detailed configuration of the correction signal generating circuit 48 in the embodiment of this invention as shown in FIG. 1. In this figure, 60, 62 and 64 indicate smoothing circuits, 66 and 68 are variable gain amplifiers having an exponential function as the gain control characteristic, 70 and 72 are subtracters, and 74 and 76 are amplifiers having gains $K_R$ and $K_B$ respectively. The color signals $R_1$, $G_1$ and $B_1$ coming from the color separation circuit 14 are smoothed by the smoothing circuits 60, 62 and 64 respectively. The output $R_{S1}$ of the smoothing circuit 60 and the output $B_{S1}$ of the smoothing circuit 64 are amplified by the variable gain amplifiers 66 and 68 respectively. The gains in the variable gain amplifiers 66 and 68 are controlled by the outputs $C_{R1}$ and $C_{B1}$ of the subtracters 44 and 46 respectively. The subtracter 70 subtracts the output $G_S$ of the smoothing circuit 62 from the output $R_{S2}$ of the amplifier 66, while the subtracter 72 subtracts the output $G_S$ of the smoothing circuit 62 from the output $B_{S2}$ of the amplifier 68. The amplifiers 74 and 76 multiply the outputs of the subtracters 70 and 72 by $K_R$ and $K_B$ to produce the correction signals $d_R$ and $d_B$, which are then supplied to the adders 50 and 52 respectively.

Figure 3:
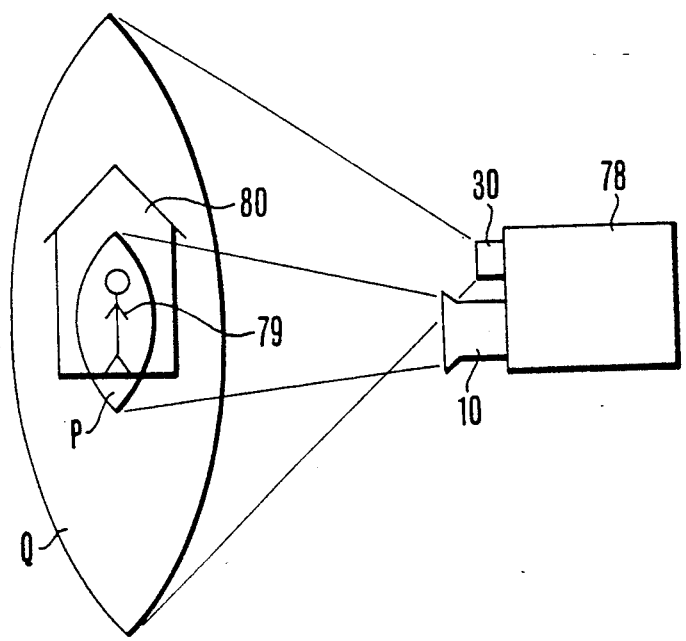
FIG. 3 is a schematic view showing the visual fields of the photographic optical system 10 and the colorimetric optical system 30 as shown in FIG. 1 for comparison.

Next, the operations of this embodiment in the actual photographing conditions will be described below. FIG. 3 shows an image sensing apparatus 78 which has a configuration as shown in FIG. 1, an object 79 and a background 80. It is assumed that a region Q is the visual field of the colorimetric optical system 30 (or the coverage of a lighting source) and that a region P is the object scope of the photographic optical system 10. If the region P has a part in dark color, for example, the dark color should influence at least on a part, P/Q, of the incident light onto the colorimetric optical system 30. This can be expressed by the formulas as given below. Assuming that only an object image is taken by the photographic optical system 10, the signals $R_1$, $G_1$, $S_R$, $S_G$ and $C_{R1}$ as shown in FIG. 1 can be expressed by the following equations:

$$R_1 = L \times R_R \times K_L \times G_C$$

$$G_1 = L \times R_G \times G_C$$

$$S_R = L \times A \times K_L \times G_W$$

$$S_G = L \times R_G \times G_W$$

$$C_{R1} = \log(A \times K_L / R_G)$$

wherein:
A = refrection factor of red component in region Q
= $(1 - P/Q) \times R_G + R_R \times P/Q$
L = object illumination
$R_R$ = reflection factor of red component in object $R_G$ = reflection factor of green component in object and reflection factor of red and green components in the part other than the object $K_L$ = ratio of red to green component $G_C$ = gain in image sensing system $G_W$ = gain in colorimetric system.

Since the gain control characteristic of the amplifiers 66 and 68 is an exponential function, the correction signal $d_R$ can be expressed by the following equation:

$$d_R = (R_1 \times \exp(-C_{R1}) - G_1) \times K_R$$
$$= L \times G_C \times R_G \times K_R \times (1 - P/Q) \times (R_R - R_G)/A$$

If $L \times G_C = 1$ and $R_G = 1$ are set by a stop, this means that when the region Q is white and a reflection factor of green component in the region P is "1", the following equations are obtained:

$$C_{R1} = \log (A \times K_L) \dots \quad (1)$$

$$d_R = \frac{K_R \times (1 - P/Q) \times (R_R - 1)}{1 + P/Q(R_R - 1)} \quad (2)$$

Table 1 lists the values $C_{R1}$ and $d_R$ according to the value $R_R$ decreasing from 1 (that is, the blue color being more darkened), assuming $P/Q = 0.2$, $K_L = 1$ and $K_R = 1$ in the equations (1) and (2). It is shown that the values $C_{R1}$ and $d_R$ draw similar curves so that the output of the adder 50 is kept constant irrespective of the color saturation of the region P, and that $C_{R1} \approx -d_R$, that is, the error can be almost completely corrected, if $K_R \approx -0.2$. In fact, the picture may be more natural in $C_{R1} > -d_R$ (at a small correction value) or $C_{R1} < -d_R$ (in an overcorrection) than in $C_{R1} = -d_R$ Therefore, the value d may be modified properly

TABLE 1

| $R_R$ | $C_{R1}$ | $d_R$ |
|---|---|---|
| 1 | 0 | 0 |
| 0.8 | −0.040 | −0.166 |
| 0.6 | −0.083 | −0.347 |
| 0.4 | −0.128 | −0.545 |
| 0.2 | −0.174 | −0.762 |
| 0 | −0.223 | −1 | wherein $P/Q = 0.2$, $K_L = 1$ and $K_R = 1$.

Figure 4:
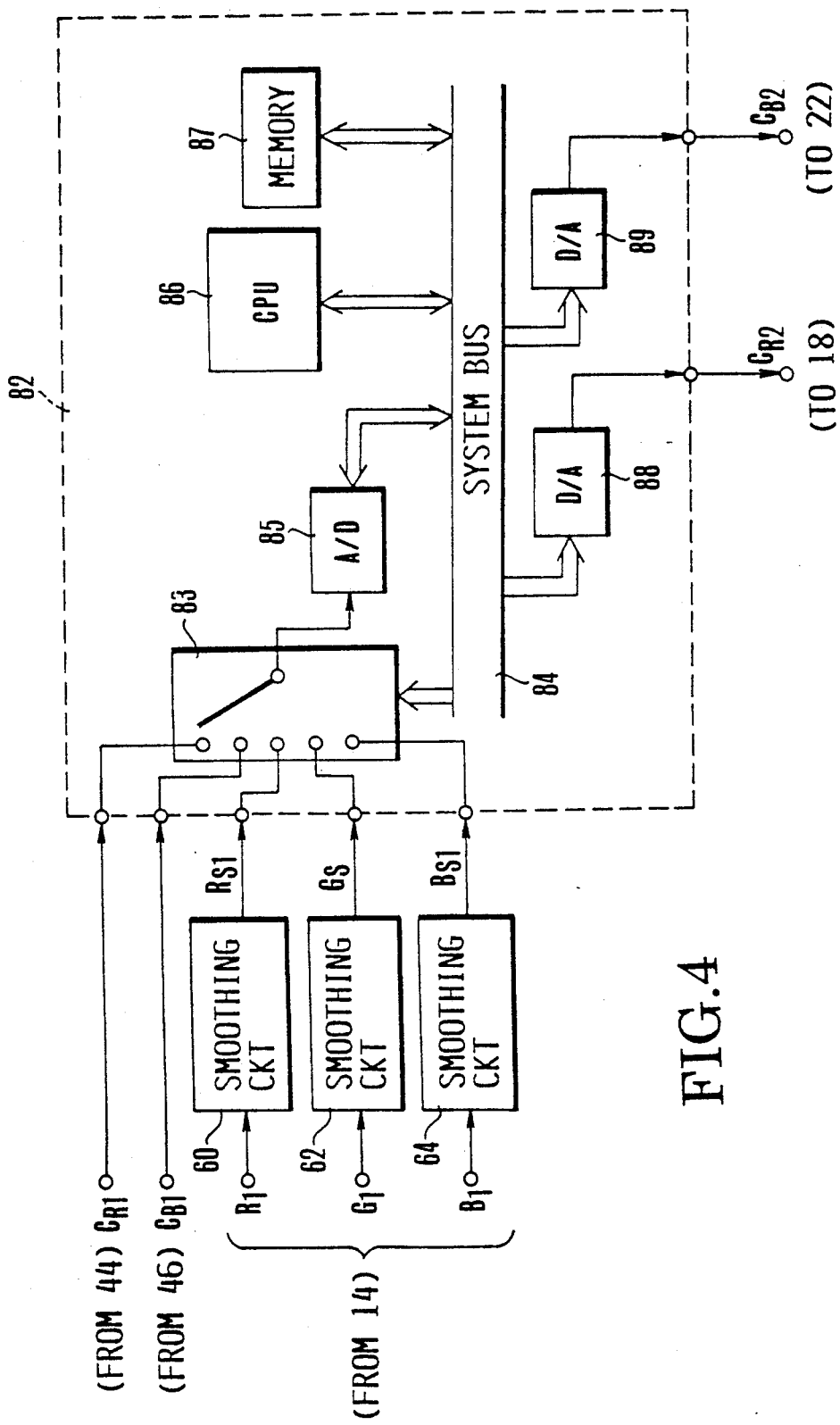
FIG. 4 is a block diagram showing the partial configuration of a variant embodiment employing a digital computing circuit.

FIG. 4 is a block diagram showing the partial configuration of a variant embodiment employing a digital computing circuit instead of the correction signal generating circuit 48 and the adders 50 and 52 as shown in FIG. 1. In this figure, a microcomputer unit 82 comprises an analog data switch 83, a system bus 84, an A/D converter 85, a central processing unit (CPU) 86, a memory 87 provided with a random access memory and a read-only memory (not shown), and D/A converters 88 and 89.

Figure 5:
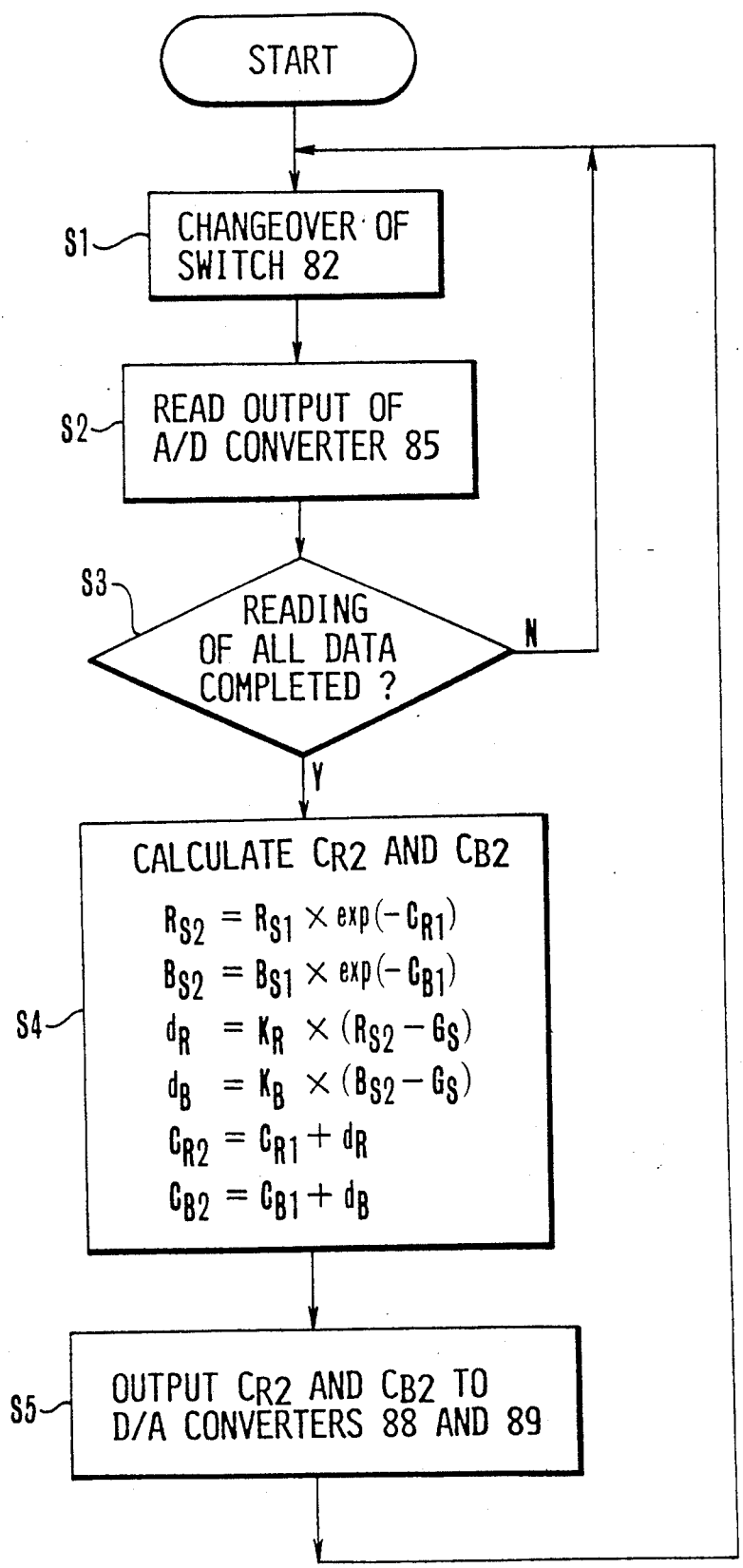
FIG. 5 is a flow chart showing the operations of the variant embodiment as shown in FIG. 4.

FIG. 5 is a flow chart illustrating the operations of the microcomputer unit 82. The color signals $R_1$, $G_1$ and $B_1$ from the color separation circuit 14 are smoothed by the smoothing circuits 60, 62 and 64 respectively, as shown in FIG. 2. The signals $C_{R1}$ and $C_{B1}$ and the outputs of the smoothing circuits 60, 62 and 64 are supplied by the switch 83 to the A/D converter 85 in the preset order (Step S1). The output data of the A/D converter 85 are written in the memory 87 through the system bus 84 and the CPU 86 (Steps S2 and S3). The CPU 86 carries out the same operations as the circuit as shown in FIG. 2 by using the data stored in the memory 87 (Step S4). The results of operations, digital data $C_{R2}$ and $C_{B2}$, are converted by the D/A converters 88 and 89 respectively into analog signals, which are then supplied to the R processing circuit 18 and the B processing circuit 22 respectively (Step S5). These analog signals control the gains in the R processing circuit 18 and the B processing circuit 22 to adjust the white balance.

From the description as given above, it will be easily understood that the white balance adjusting circuit according to this invention can eliminate effectively any error due to the colors of an object in the white balance adjustment, though the configuration of the circuit is very simple.

Figure 6:
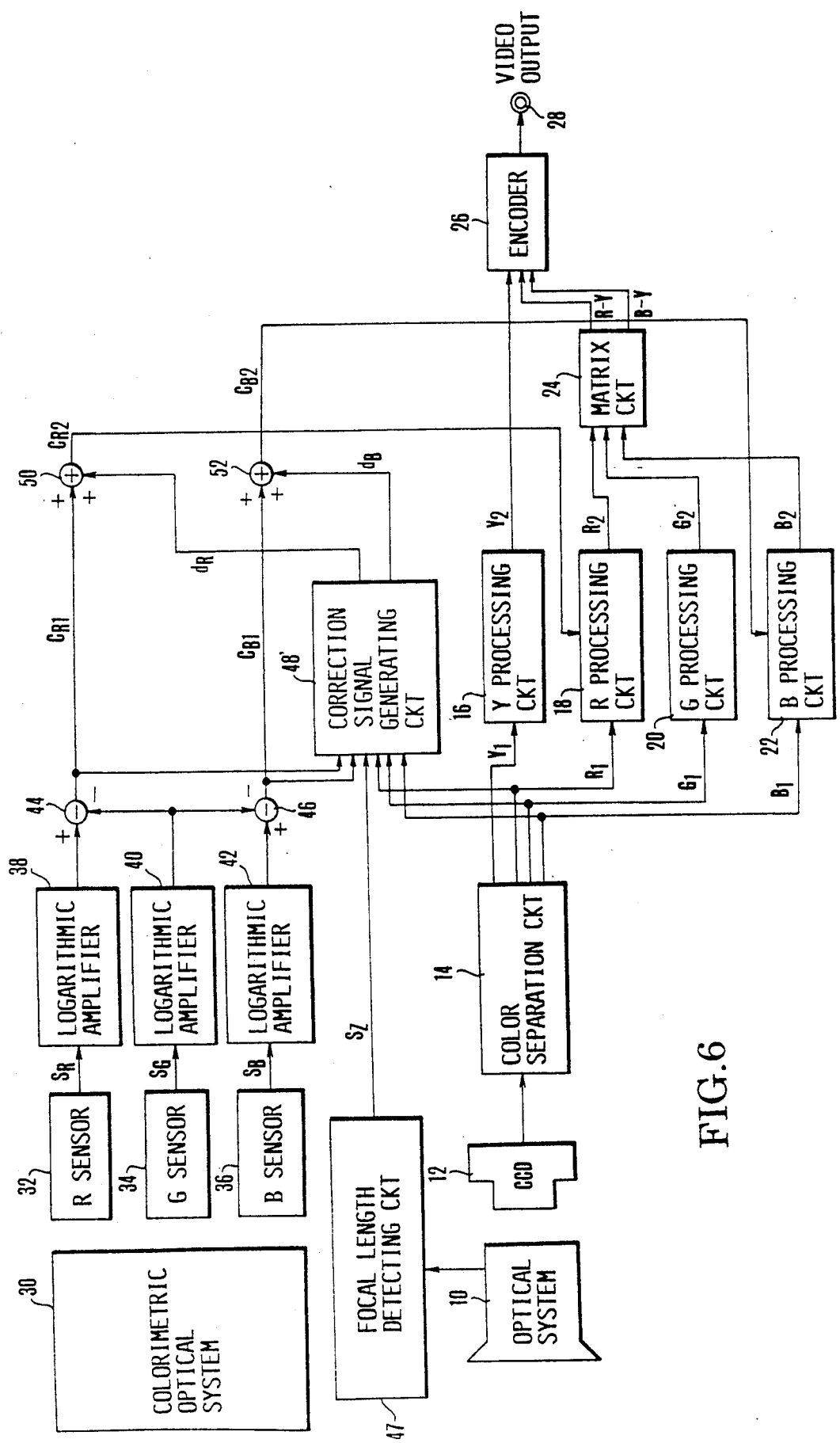
FIG. 6 is a block diagram showing the configuration of another embodiment according to this invention.

FIG. 6 is a block diagram showing the configuration of another embodiment according to this invention. In this figure, the same reference numbers indicate the same corresponding elements as shown in FIGS. 1 to 5. A focal-length detecting circuit 47 comprises, for example, a potentiometer coupled to a zoom ring to detect the focal length of the photographic optical system 10 and produces a signal $S_Z$ indicative of the focal length. A correction signal generating circuit 48' produces correction signals $d_R$ and $d_B$ from the outputs $C_{R1}$ and $C_{B1}$ of the subtracters 44 and 46, the focal length signal $S_Z$ and the outputs R, G and B of the color separation circuit 14.

Figure 7:
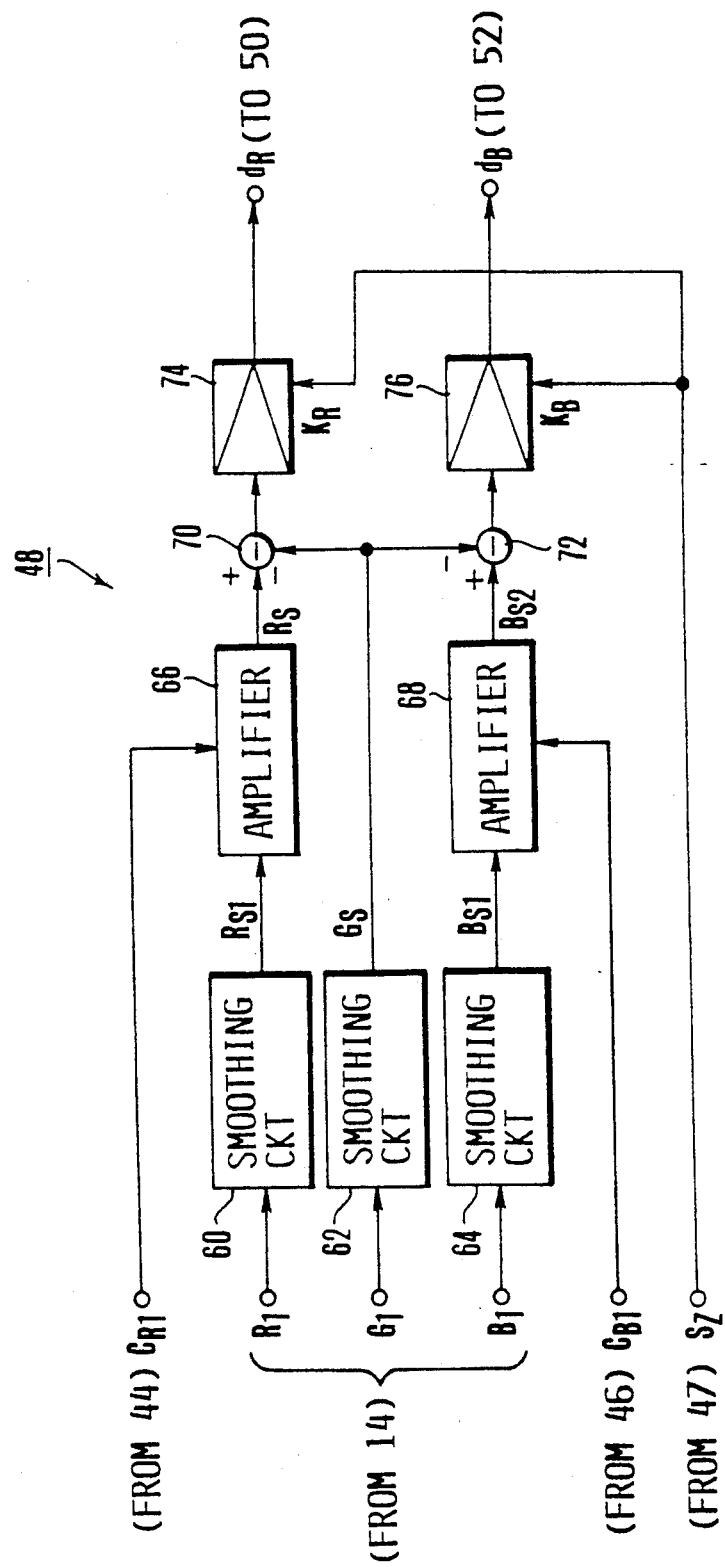
FIG. 7 is a block diagram showing the detailed configuration of the correcting signal generating circuit 48' as shown in FIG. 6.

FIG. 7 is a block diagram showing the detailed configuration of the correction signal generating circuit 48' in the second embodiment of this invention. In this figure, the same reference numbers indicate the same corresponding elements as shown in FIGS. 1 to 6. This correction signal generating circuit 48' is different from the similar circuit 48 as shown in FIG. 2 in the point that the gains in the amplifiers 74 and 76 are controlled by the focal length signal $S_Z$.

Now, it will be examined how the correction value depends upon the focal length. If the focal length is doubled, for example, the area of the region P as shown in FIG. 3 is 25% larger. Assuming that the original value P/Q is 0.2, the new value is $P/Q = 0.05$ after the focal length was doubled. Table 2 lists the values $C_{R1}$ and $d_R$ in these conditions. It shows that any error can be corrected at $K_R \approx -0.05$. Therefore, such a value may be selected for the gain $K_R$ (or $K_B$) in the amplifier 74 (or 76) that is inversely proportional nearly to the squared focal length.

TABLE 2

| $R_R$ | $C_{R1}$ | $d_R$ |
|---|---|---|
| 1 | 0 | 0 |
| 0.8 | −0.010 | −0.192 |
| 0.6 | −0.020 | −0.388 |
| 0.4 | −0.030 | −0.588 |
| 0.2 | −0.041 | −0.792 |
| 0 | −0.051 | −1 | wherein $P/Q = 0.05$, $K_L = 1$ and $K_R = 1$.

Figure 8:
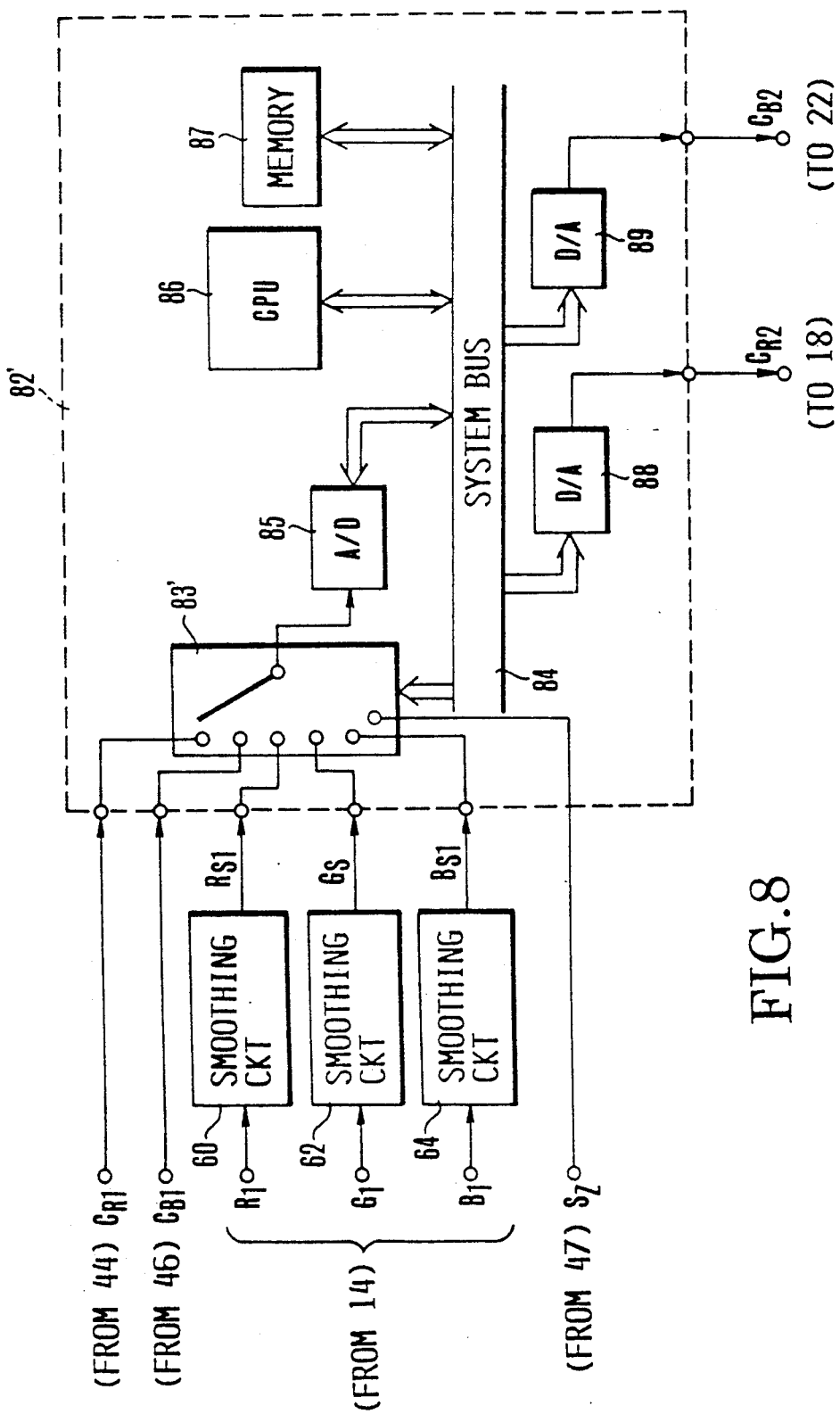
FIG. 8 is a block diagram showing the partial configuration of a variant embodiment employing a digital computing circuit.

FIG. 8 is a block diagram showing the partial configuration of the second embodiment employing a digital computing circuit instead of the correction signal generating circuit 48' and the adders 50 and 52. In this figure, 83' is an analog data switch, which is different from the switch as shown in FIG. 4 in the point that it receives also the signal $S_Z$ from the focal-length detecting circuit 47.

The second embodiment thus configured is controlled by the same program as shown in FIG. 5.

From the description as given above, it will be easily understood that the second embodiment of this invention can eliminate effectively any error due to the colors of an object in the white balance adjustment, and that a more sophisticated white balance adjustment is provided by considering the influence of the focal length in a photographic optical system used.

What is claimed is:

1. An image sensing apparatus comprising:
   first control signal forming means for forming a first control signal to control the white balance of outputs of image sensing means, by using image signals provided by said image sensing means;
   second control signal forming means for forming a second control signal to control the white balance of outputs of said image sensing means, by using outputs of color temperature detecting means; and
   control means for controlling the white balance of outputs of said image sensing means by varying a combination of said first and second control signals in accordance with a ratio of color signals provided by said image sensing means and said color temperature detecting means.

2. An apparatus according to claim 1, wherein said color temperature detecting means includes a plurality of color sensor elements.

3. An apparatus according to claim 2, wherein said plurality of color sensor elements includes at least a red sensor and a blue sensor.

4. An image sensing apparatus comprising:
   first control signal forming means for forming a first control signal to control the white balance of outputs of image sensing means, by using image signals provided by said image sensing means;
   a zoom optical system for forming an optical image on said image sensing means at a variable magnification;
   second control signal forming means for forming a second control signal to control the white balance of outputs of said image sensing means, by using outputs of color temperature detecting means; and
   control means for controlling the white balance of outputs of said image sensing means by varying a combination of said first and second control signals in accordance with the variable magnification of zoom in said zoom optical system.

5. An apparatus according to claim 4, wherein said color temperature detecting means includes a plurality of color sensor elements.

6. An apparatus according to claim 5, wherein said plurality of color sensor elements include at least a red sensor and a blue sensor.

* * * * *